(12) United States Patent
Troester et al.

(10) Patent No.: US 11,294,724 B2
(45) Date of Patent: Apr. 5, 2022

(54) SHARED RESOURCE ALLOCATION IN A MULTI-THREADED MICROPROCESSOR

(71) Applicant: Advanced Micro Devices, Inc., Santa Clara, CA (US)

(72) Inventors: Kai Troester, Boxborough, MA (US); Neil Marketkar, Boxborough, MA (US); Matthew T. Sobel, Boxborough, MA (US); Srinivas Keshav, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 90 days.

(21) Appl. No.: 16/585,424

(22) Filed: Sep. 27, 2019

(65) Prior Publication Data

US 2021/0096920 A1    Apr. 1, 2021

(51) Int. Cl.
  *G06F 9/46*   (2006.01)
  *G06F 9/50*   (2006.01)
  *G06F 9/48*   (2006.01)

(52) U.S. Cl.
  CPC .......... *G06F 9/5038* (2013.01); *G06F 9/4887* (2013.01); *G06F 9/505* (2013.01); *G06F 9/5061* (2013.01)

(58) Field of Classification Search
  CPC ...... G06F 9/5038; G06F 9/4887; G06F 9/505; G06F 9/5061
  See application file for complete search history.

(56) References Cited

U.S. PATENT DOCUMENTS

| | | |
|---|---|---|
| 7,360,064 B1 | 4/2008 | Steiss et al. |
| 8,087,029 B1 | 12/2011 | Lindholm et al. |
| 8,347,309 B2 | 1/2013 | Smolens et al. |
| 2005/0141554 A1 | 6/2005 | Hammarlund et al. |
| 2008/0250233 A1 | 10/2008 | Marden et al. |
| 2010/0299499 A1 | 11/2010 | Golla et al. |
| 2011/0029978 A1 | 2/2011 | Smolens |
| 2014/0282589 A1 | 9/2014 | Kuang et al. |
| 2020/0183744 A1* | 6/2020 | Kim .................. H04L 67/10 |

OTHER PUBLICATIONS

Tullsen, "Exploiting Choice: Instruction Fetech and Issue on an Implementable Simultaneous Multithreading Processor", dated 1996, 12 pages.

(Continued)

*Primary Examiner* — Gregory A Kessler
(74) *Attorney, Agent, or Firm* — Hickman Becker Bingham Ledesma LLP; Edward A. Becker (57) ABSTRACT

An approach is provided for allocating a shared resource to threads in a multi-threaded microprocessor based upon the usefulness of the shared resource to each of the threads. The usefulness of a shared resource to a thread is determined based upon the number of entries in the shared resource that are allocated to the thread and the number of active entries that the thread has in the shared resource. Threads that are allocated a large number of entries in the shared resource and have a small number of active entries in the shared resource, indicative of a low level of parallelism, can operate efficiently with fewer entries in the shared resource, and have their allocation limit in the shared resource reduced.

20 Claims, 4 Drawing Sheets

(56) References Cited

OTHER PUBLICATIONS

Mars, Jason, "Multiprocessors and Multithreading", dated Mar. 3, 3013, 60 pages.
The International Searching Authority, "Search Report" in application No. PCT/US2020/049220, dated Dec. 9, 2020, 14 pages.
European Patent Office, "Search Report", in application No. PCT/US2020/049220, dated Nov. 23, 2020, 12 pages.
European Claims in application No. PCT/US2020/049220, dated Nov. 2020, 7 pages.
Current Claims in application No. PCT/US2020/05038, dated Dec. 2020, 5 pages.
Troester, U.S. Appl. No. 16/585,586, filed Sep. 27, 2019, Office Action, dated Dec. 24, 2020.

\* cited by examiner

Shared Resource Allocation in a Multi-Threaded Microprocessor

FIG. 1

Multi-threaded Microprocessor 100

Shared Resource 140

Shared Resource Logic 150

Thread Registers 130

Control Unit 110

ALU 120

FIG. 2

| Thread | Allocated Entries (A) | Active Entries (B) | Usefulness Metric (B/A) |
|---|---|---|---|
| T0 | A0 | B0 | B0/A0 |
| T1 | A1 | B1 | B1/A1 |
| T2 | A2 | B2 | B2/A2 |
| T3 | A3 | B3 | B3/A3 |

CCW 1

| Thread | Allocated Entries (A) | Active Entries (B) | Allocation Limit |
|---|---|---|---|
| T0 | 12 | 1 | 50 |
| T1 | 8 | 6 | 50 |
| T2 | 7 | 4 | 50 |
| T3 | 4 | 2 | 50 |

FIG. 5B

CCW 2

| Thread | Allocated Entries (A) | Active Entries (B) | Allocation Limit |
|---|---|---|---|
| T0 | 11 | 2 | 10 |
| T1 | 9 | 5 | 50 |
| T2 | 12 | 2 | 50 |
| T3 | 5 | 2 | 50 |

FIG. 5C

CCW 3

| Thread | Allocated Entries (A) | Active Entries (B) | Allocation Limit |
|---|---|---|---|
| T0 | 11 | 5 | 10 |
| T1 | 11 | 7 | 50 |
| T2 | 12 | 1 | 10 |
| T3 | 6 | 2 | 50 |

FIG. 5D

CCW 4

| Thread | Allocated Entries (A) | Active Entries (B) | Allocation Limit |
|---|---|---|---|
| T0 | 8 | 3 | 50 |
| T1 | 12 | 8 | 50 |
| T2 | 10 | 2 | 10 |
| T3 | 10 | 7 | 50 |

SHARED RESOURCE ALLOCATION IN A MULTI-THREADED MICROPROCESSOR

CROSS-REFERENCE TO RELATED APPLICATIONS

This application is related to U.S. patent application Ser. No. 16/585,586, filed Sep. 27, 2019, entitled "SOFT WATERMARKING IN THREAD SHARED RESOURCES IMPLEMENTED THROUGH THREAD MEDIATION,".

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Multi-threaded microprocessors often have shared resources, such as load queues and reservation stations, that are used by multiple threads. Shared resources are often allocated to threads on a first come, first served, basis. One problem with this approach is that if threads using the shared resource have different execution characteristics, one thread may hinder the efficient execution of other threads by acquiring an overly large share of the shared resource. For example, a thread may acquire a majority of the entries in a load queue, which can degrade the performance of other threads if too few entries are available to those threads when they would benefit from having more entries in the load queue.

One technical solution to this problem is to restrict shared resource usage by threads. For example, the number of entries in a shared resource allocated to threads may be capped, either for all threads, or on an individual thread basis. However, limiting the number of entries allocated to threads without knowing the effect on particular threads can result in overall performance degradation, because the execution characteristics of threads may vary greatly, and some threads might benefit from having more than the limited number entries in the shared resource. Thus, there is a need for a better approach for managing the use of shared resources in a multi-threaded microprocessor.

BRIEF DESCRIPTION OF THE DRAWINGS

Embodiments are depicted by way of example, and not by way of limitation, in the figures of the accompanying drawings and in which like reference numerals refer to similar elements.

DETAILED DESCRIPTION

Figure 1:
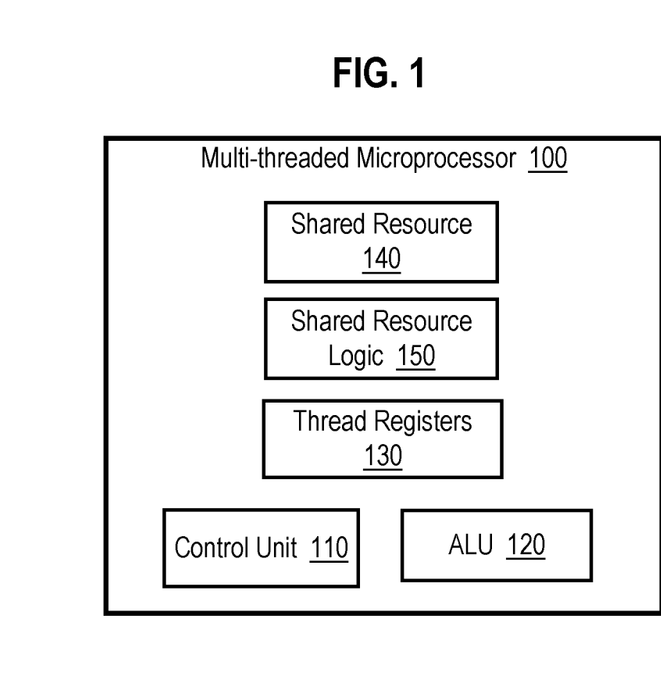
FIG. 1 is a block diagram that depicts a multi-threaded microprocessor.

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.
I. Overview
II. Architecture
III. Managing Thread Access to a Shared Resource Based Upon Usefulness
  A. Overview
  B. Changing Shared Resource Allocation Limits for Threads
  C. The Usefulness Metric
  D. Addressing Resource Allocation Oscillation
I. Overview An approach is provided for allocating a shared resource to threads in a multi-threaded microprocessor based upon the usefulness of the shared resource to each of the threads. The usefulness of a shared resource to a thread is determined based upon the number of entries in the shared resource that are allocated to the thread and the number of active entries that the thread has in the shared resource. Threads that both are allocated a large number of entries in the shared resource and have a small number of active entries in the shared resource, indicative of a low level of parallelism, can operate efficiently with fewer entries in the shared resource, and have their allocations in the shared resource reduced. As used herein, the term "active entry" refers to an entry in a shared resource that is doing work, e.g., currently being used to prepare for, or execute, an instruction. Different threads may have different levels of usefulness for the same shared resource and the approach is applicable to any number of threads and shared resources. The approach reduces the likelihood that a thread acquires such a large number of entries in a shared resource that it degrades the performance of other threads using the shared resource.
II. Architecture FIG. 1 is a block diagram that depicts a multi-threaded microprocessor 100 that includes a control unit 110, an Arithmetic Logical Unit (ALU) 120, thread registers 130, a shared resource 140 and shared resource logic 150. The thread registers 130 are registers that are dedicated to particular threads. The microprocessor may support any number of threads and embodiments are not limited to any particular number of threads. The shared resource 140 may be any type of resource that is used by multiple threads in the multi-threaded microprocessor 100. Examples of the shared resource 140 include, without limitation, a load queue, a register file, a reservation station, etc.

The shared resource logic 150 manages the allocation of the shared resource 140 to threads executing on the multi-threaded microprocessor 100 based upon the usefulness of the shared resource 140 to the threads, as described in more detail hereinafter. The shared resource logic 150 may be implemented by computer hardware, computer software, or any combination of computer hardware and software. The shared resource logic 150 is depicted in FIG. 1 as a separate element for discussion purposes only and the shared resource logic 150 may be incorporated into other elements within the multi-threaded microprocessor 100, for example resource allocation logic, thread switching logic, and dispatch restriction logic. The multi-threaded microprocessor 100 may include additional elements that are not depicted in FIG. 1 and that may vary depending upon a particular implementation.

III. Managing Thread Access to a Shared Resource Based Upon Usefulness

A. Overview

Figure 2:
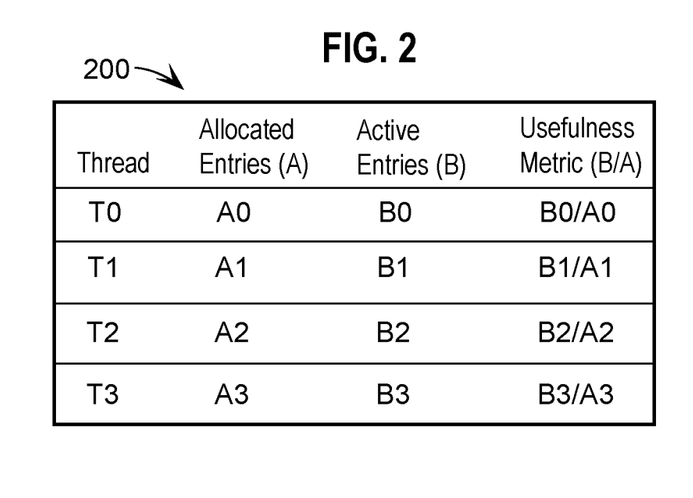
FIG. 2 is a block diagram that depicts a table of information used by shared resource logic to manage access to a shared resource.

The shared resource logic 150 evaluates the usefulness of the shared resource 140 to threads and changes allocation limits assigned to the threads for the shared resource 140 based upon the usefulness. As used herein, the term "allocation limit" is a limit on the number of entries in the shared resource 140 that may be allocated to a thread. FIG. 2 is a block diagram that depicts a table 200 of information used by the shared resource logic 150 to manage access to the shared resource 140. Each row in the table 200 corresponds to a thread executing on the multi-threaded microprocessor 100. The columns of data for each thread include in the first column, data that identifies the thread; in the second column, a number of entries in the shared resource 140 that are currently allocated to the thread; in the third column, a number of active entries for the thread in the shared resource 140; and in the fourth column, a usefulness metric. The usefulness metric is a ratio of the number of active entries to the number of entries that are currently allocated to the thread. The information in table 200 may be maintained internal or external to the multi-threaded microprocessor 100. The number of entries in the shared resource 140 that are allocated to each thread and the number of active entries in the shared resource 140 for each thread may be tracked using, for example, counters or other hardware elements.

Figure 3:
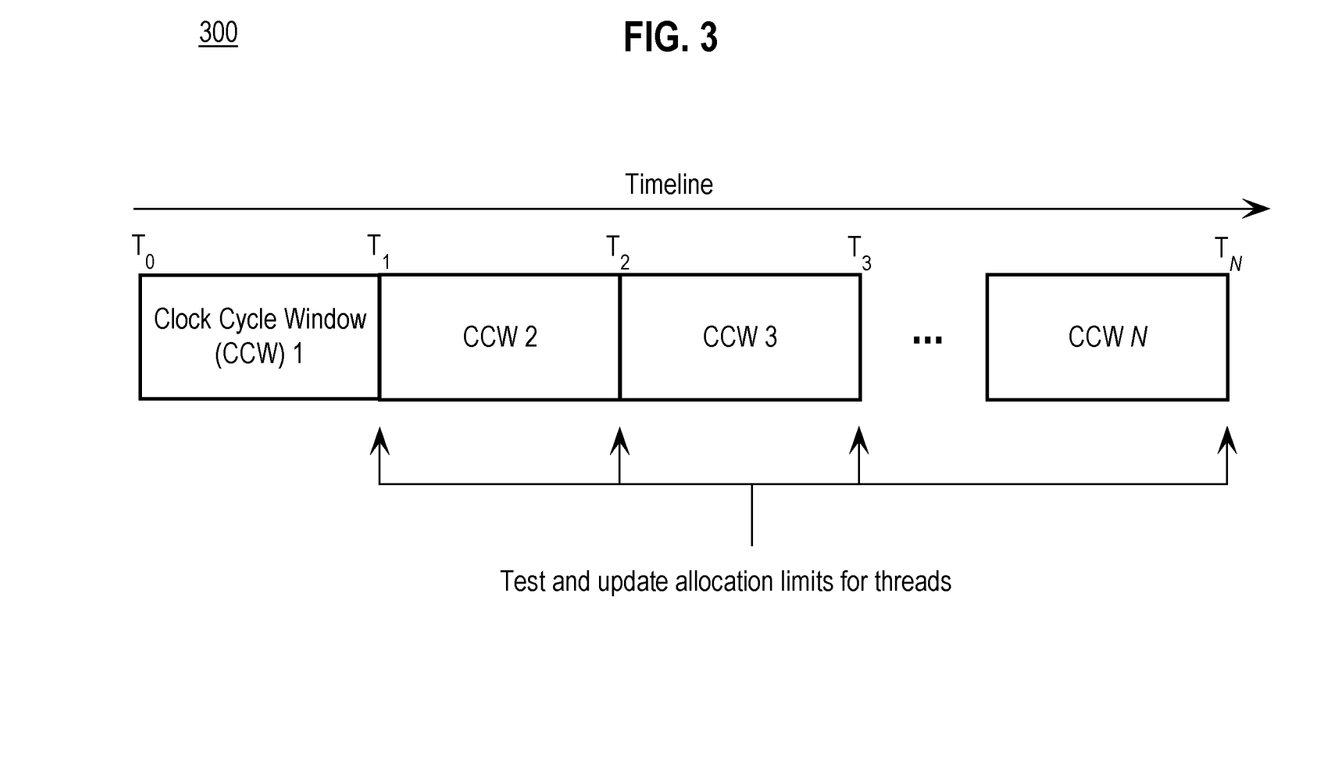
FIG. 3 is a block diagram that depicts a timeline over which shared resource logic operates to change the allocation of a shared resource to threads.

FIG. 3 is a block diagram that depicts a timeline 300 over which the shared resource logic 150 changes allocation limits assigned to threads for the shared resource 140 based upon the usefulness of the shared resource 140 to the threads. The timeline 300 includes N number of time periods in the form of clock cycle windows (CCWs), where each CCW is a set of clock cycles. The number of clock cycles in each CCW may be determined using performance modeling and may vary depending upon a particular implementation. The performance modeling may balance factors such as reacting quickly enough to prevent a thread from consuming so many entries in a shared resource that it degrades the performance of other threads, with not overly restricting the number of entries in the shared resource available to threads. In an embodiment, each of the CCWs includes 16 clock cycles. The number of clock cycles may be configured in the shared resource logic 150 and may be selectable via, for example, the operating system. Although the CCWs are depicted in FIG. 3 as being contiguous, the CCWs are not limited to being contiguous and may have interstitial clock cycles. In addition, the number of interstitial cycles between CCWs may vary across CCWs and also may change over time. Although embodiments are described herein in the context of time periods in the form of clock cycle windows, embodiments are not limited to clock cycle windows per se.

Starting at time $T_0$, the use of the shared resource 140 by threads is monitored over CCW 1 and at time $T_1$, which is the end of CCW 1, the use of the shared resource 140 by threads is evaluated and allocation limits assigned to threads are updated for the next CCW 2. Note that CCW 2 may occur any number of clock cycles after CCW 1 and the number of interstitial clock cycles between CCW 1 and CCW 2 may vary over time. According to an embodiment, the shared resource logic 150 identifies threads that are allocated a sufficiently large number of entries in the shared resource to potentially degrade the performance of other threads. The shared resource logic 150 then determines whether any of these threads have a small number of active entries in the shared resource 150. Threads that are both allocated a large number of entries in the shared resource 140 and have a small number of active entries in the shared resource 140 can operate efficiently with fewer entries in the shared resource 150, so their allocation limits are reduced.

According to an embodiment, the aforementioned determination is made using thresholds, for example an allocation threshold and an active entry threshold. For a particular thread, if both the number of entries in the shared resource that are currently allocated to the particular thread exceeds the allocation threshold and the number of active entries in the shared resource for the particular thread is less than the active entry threshold, then the allocation limit for the particular thread is reduced.

The allocation threshold may be designed using performance modeling and is selected to identify threads that are consuming too large a number of entries in a shared resource and potentially degrading the performance of other threads, i.e., by hogging the shared resource. The active entry threshold is selected to identify threads that have a low level of parallelism and therefore are likely to still operate efficiently with a smaller number of entries in the shared resource. A low level of parallelism may occur, for example, when a thread is executing a series of add instructions, where each instruction is dependent on the result of the previous instruction. The use of these two thresholds in combination prevents threads with at least a threshold number of entries in a shared resource and a low level of parallelism from consuming so many entries in the shared resource that the performance of other threads is degraded.

B. Changing Shared Resource Allocation Limits for Threads

Figure 4:
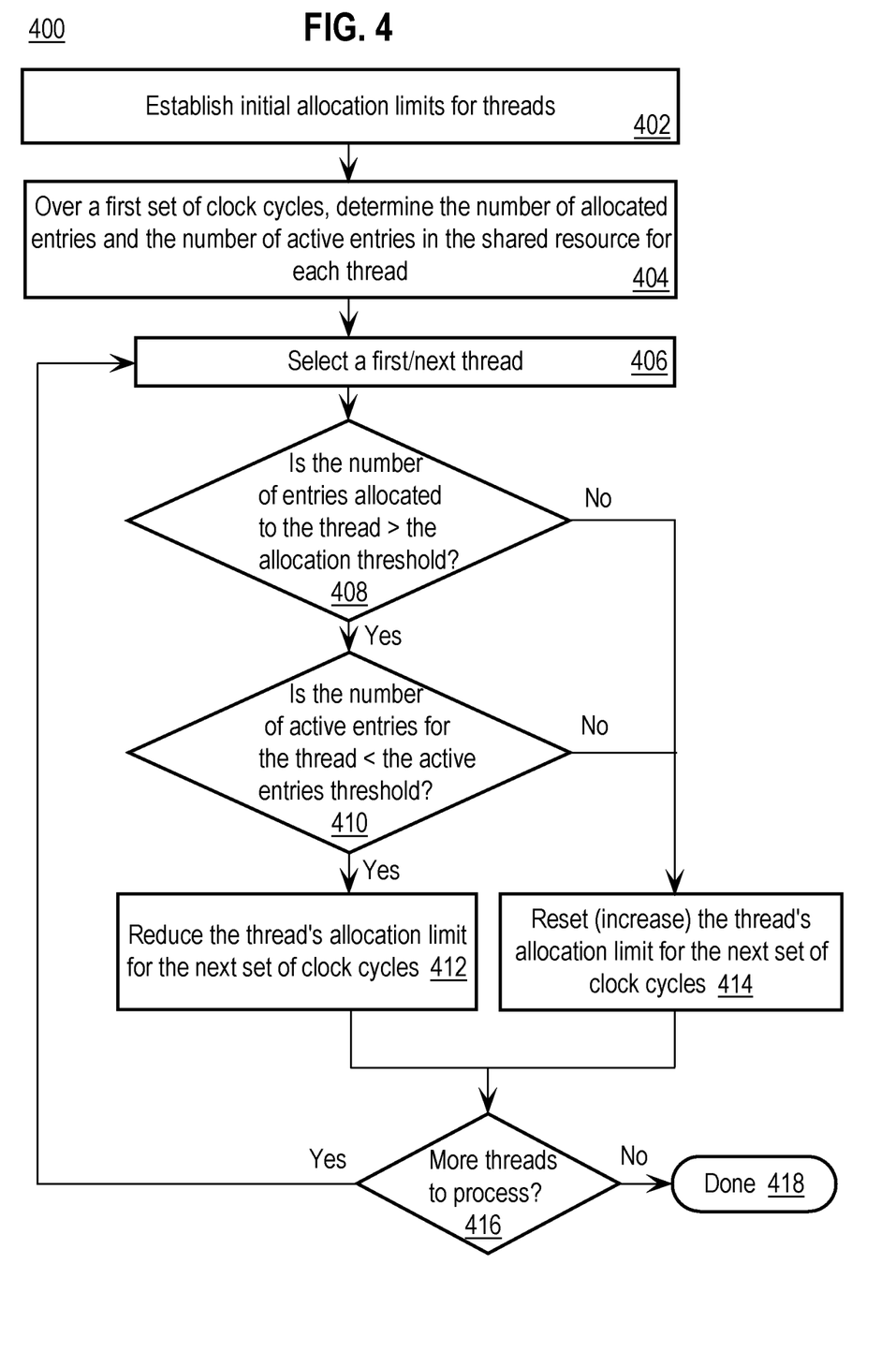
FIG. 4 is a flow diagram that depicts allocating a shared resource to threads on a multi-threaded microprocessor based upon the usefulness of the shared resource to the threads.

FIG. 4 is a flow diagram 400 that depicts allocating a shared resource to threads on a multi-threaded microprocessor based upon the usefulness of the shared resource to the threads.

In step 402, initial allocation limits for a shared resource are established for threads on a multi-threaded microprocessor. In the current example, an initial allocation limit for the shared resource 140 is established for threads T0-T3 executing on the multi-threaded microprocessor 100.

According to an embodiment, the initial allocation limit is the total number of entries available in the shared resource. For example, assuming that the shared resource 140 is a load queue with 50 entries, the initial allocation limit is established at 50 for each of the threads T0-T3. Note that assigning the total number of available entries in the shared resource 140 as an initial allocation limit for all of the threads potentially allows any of the threads to consume a large amount of the entries in the shared resource 140 and degrade the performance of the other threads. Alternatively, the initial allocation limit may be less than the total number of entries available in the shared resource. For example, for a load queue with 50 entries, the initial allocation limit may be established at 10 for each of the threads T0-T3.

The initial allocation limit may be thread specific. For example, a high priority thread, e.g., a thread that has a special designation, or a thread that will be involved in satisfying a particular Quality Of Service (QOS) requirement, may be assigned an initial allocation limit that is greater than other threads that have a lower priority. In the prior example, a high priority thread may be assigned an initial allocation limit of 50 while other threads are assigned an initial allocation limit of 30. Initial allocation limits may be preconfigured in the shared resource logic 150, stored in configuration data that is used by the shared resource logic 150, or configured via an operating system. In addition, shared resource logic 150 may reset thread allocation limits to the initial allocation limits, for example, upon power up or in response to receiving a command, such as an operating system command.

Figure 5A:
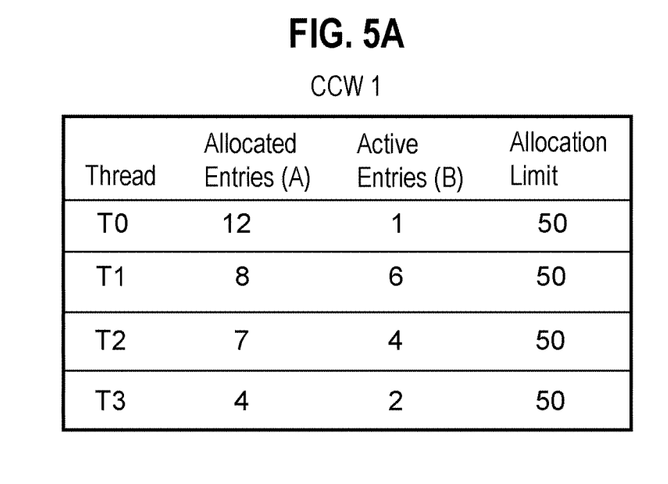
FIG. 5A depicts example usage data acquired for threads over a first clock cycle window.

In step 404, the number of allocated entries and the number of active entries for each thread are determined over a first set of clock cycles. For example, the shared resource logic 150 may determine the number of allocated entries and the number of active entries for threads T0-T3 over CCW 1. FIG. 5A depicts example usage data for threads T0-T3 over CCW 1. In this example, the initial allocation limit is 50 for threads T0-T3 over CCW 1. The number of active entries is the number of entries that are currently doing work and may vary during CCW 1 as instructions are processed. Therefore, according to an embodiment, the number of active entries is the least number of active entries during CCW 1. In the example depicted in FIG. 5A, thread T1 had the greatest number of active entries during CCW 1, indicating the highest level of parallelism relative to the other threads, while thread T0 had the least number of active entries during CCW 1. Correspondingly, thread T1 would benefit more than thread T0 from having more entries in the shared resource 140.

In step 406, a first/next thread is selected. In the present example, thread T0 is selected, although any approach may be used to select the first thread to be evaluated. In step 408, a determination is made whether the number of entries allocated to the selected thread exceeds the allocation threshold. For example, the shared resource logic 150 determines whether the number of entries in the shared resource 140 allocated to thread T0 is greater than the allocation threshold. Assuming the allocation threshold is 10, the allocation threshold is satisfied, since the 12 entries allocated to thread T0 is greater than the allocation threshold of 10, and control proceeds to step 410. This means that thread T0 has been allocated a sufficiently large number of entries in the shared resource 140 to potentially degrade the performance of other threads.

In step 410, a determination is made whether the number of active entries for the thread is less than the active entries threshold. As previously mentioned, the active entry threshold is used to identify threads that have a low level of parallelism and therefore are likely to still operate efficiently with a smaller allocation of the shared resource. In the present example, the shared resource logic 150 determines whether the number of active entries for thread T0 in the shared resource 140 is less than the active entry threshold. Assuming the active entry threshold is three, the active entry threshold is satisfied, since the one active entry for thread T0 is less than the active entry threshold of three, and control proceeds to step 412. Having satisfied both thresholds in steps 408 and 410, thread T0 has a sufficiently large number of entries in the shared resource 140 to potentially degrade the performance of other threads and also has a low level of parallelism. Thread T0 can therefore operate efficiently with a smaller number of entries in the shared resource 140.

In step 412, the thread's allocation limit for the shared resource is reduced to prevent the thread from degrading the performance of other threads. In the present example, thread T0's allocation limit for the shared resource 140 is reduced for the next time period, i.e., the next clock cycle window CCW 2. The amount of the reduction for an allocation limit may vary depending upon a particular implementation, and embodiments are not limited to any particular reduction methodology. According to an embodiment, a thread's allocation limit is reduced to a reduced allocation limit. For example, thread T0's allocated entries in the shared resource 140 may be reduced from 50 to 10. The reduced allocation limit may be configured in the shared resource logic 150 and/or may be selectable via the operating system. The value of the reduced allocation limit may be determined using modeling and is a sufficiently low value to prevent a thread from degrading the performance of other threads.

As an alternative to reducing a thread's allocation limit for a shared resource to the reduced allocation limit, the thread's allocation limit may be reduced incrementally. For example, the number of entries allocated to thread T0 may be reduced by one from 50 to 49, or by ten from 50 to 40. More complex methodologies may be implemented, for an additional computational cost. For example, the reduction may be based upon the level of active entries relative to the active entry threshold. In this example, a number of active entries that is 50% of the active entry threshold would result in a 50% reduction in the number of entries allocated to the thread. According to an embodiment, a thread's allocation limit is reduced based upon the usefulness metric for the thread.

According to an embodiment, reducing a thread's allocation limit does not cause the thread to immediately give up entries. Rather, the thread gives up entries normally as work is completed, but the thread is not granted additional entries in the shared resource 140 until the thread's current number of allocated entries falls below the reduced allocation limit. In the prior example, no additional entries in the shared resource 140 are granted to thread T0 until thread T0 has fewer than 10 allocated entries in the shared resource 140.

If in step 408 the number of entries allocated to the thread is less than or equal to the allocation threshold, or in step 410 the number of active entries for the thread is equal to or greater than the active entries threshold, then control proceeds to step 414 and the thread's allocation limit is reset, i.e., increased. Stated differently, if a small number of entries in the shared resource 140 is allocated to a thread, then the thread is not a threat to degrade the performance of other threads. Alternatively, if the thread has a large number of active entries, indicating a high level of parallelism, then the thread can benefit from having more entries in the shared resource 140 and its allocation limit is not reduced. According to an embodiment, when a thread's allocation limit is reset, the thread's allocation limit is changed to the initial allocation limit. Alternatively, a thread's allocation limit may be increased by a specified amount, which may be, for example, an increment of one, or a greater increment, such as five or ten. The increment may be configured in the shared resource logic 150 or may be selectable, for example, via the operating system. A thread's allocation limit may also be increased based upon the usefulness metric for the thread.

After a thread's allocation limit is reduced in step 412, or reset (increased) in step 414, then in step 416, a determination is made whether more threads need to be processed. If so, then control returns to step 406 and a next thread is selected and processed in the same manner. Once all of the threads have been processed, the process is complete in step 418. The process may be repeated for any number of threads, any number of times.

According to an embodiment, the testing described above is performed after every clock cycle and if step 414 is reached, then the thread's allocation limit is reset to the initial allocation limit for the next CCW. Also, that thread is no longer tested during the current CCW. If step 414 is never reached for a particular thread during the current CCW, then its allocation limit remains reduced for the current and next CCW. Other alternatives include using the average number allocated and active entries over a CCW, or using the number of allocated and active entries at the end of a CCW.

The use of both the allocation threshold and active entries threshold to identify threads that should have their allocation limits reduced addresses the technical problem of how to prevent a thread with a low level of parallelism in a multi-threaded microprocessor from degrading the performance of other threads that also use the shared resource. The technical solution identifies a thread that is currently allocated at least a threshold number of entries in a shared resource, as represented by the allocation threshold, so that the thread potentially "hogs" the shared resource and limits the entries in the shared resource that are available to other threads. A determination is then made, based upon the active entries threshold, whether the identified thread has very few active entries in the shared resource, i.e., entries that are doing work. A small number of active entries indicates a low level of parallelism and that the thread will be able to continue to operate efficiently with a smaller number of entries in the shared resource, so the allocation limit for the thread is reduced. Conversely, threads that have a small number of allocated entries or a large number of active entries will not have their allocation limit reduced.

Over time, the execution characteristics of threads may change, i.e., because of different instructions. Accordingly, the number of entries in a shared resource allocated to a thread, and the number of active entries for that thread, may also change over time. Thus, threads that did not initially have their allocation limit reduced may have their allocation limit reduced after a future CCW.

Figure 5B:
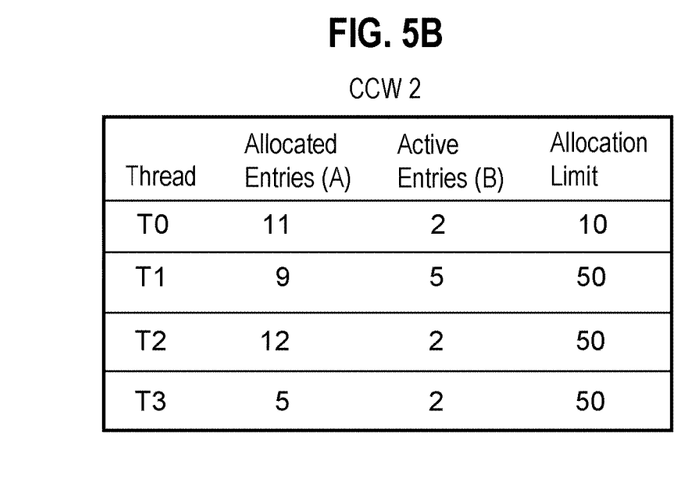
FIG. 5B depicts the example usage data acquired for threads over a second clock cycle window.

Continuing with the prior example, FIG. 5B depicts the example usage data acquired for threads T0-T3 over CCW 2. The allocation limit for thread T0 is 10 after the downward adjustment that was made after CCW 1. The allocation limits for threads T1-T3 were reset to the initial allocation limit of 50, since the number of allocated entries for these threads were all less than the allocation threshold.

At time T2 after CCW 2, the testing described above is again performed, and while thread T0 experienced a slight increase in the number of active entries from one to two, thread T0 continues to satisfy both the allocation threshold (allocated entries>10) and the active entry threshold (active entries<3), so the allocation limit for thread T0 remains at 10. However, thread T2 now also satisfies both thresholds, since the 12 entries allocated to thread T2 is greater than the allocation threshold of 10 and the two active entries is less than the active entry threshold of three. Accordingly, the allocation limit for thread T2 is reduced to 10 for the next set of clock cycles, i.e., CCW 3. The allocation limits for threads T1 and T3 are both reset to the initial allocation limit of 50 since their corresponding number of allocated entries is less than the allocation threshold.

Figure 5C:
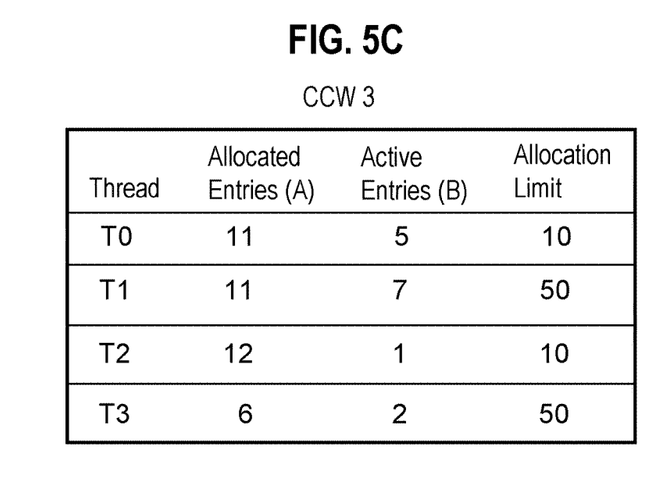
FIG. 5C depicts the example usage data acquired for threads over a third clock cycle window.

FIG. 5C depicts the example usage data acquired for threads T0-T3 over CCW 3 at time T3. During CCW 3, the allocation limits for threads T0 and T2 are still 10 because of the downward adjustment that was made after CCW 1 for thread T0 and after CCW 2 for thread T2. Over CCW 3 the number of allocated entries for thread T0 remained above the allocation threshold, but the number of active entries for thread T0 increased from two to five. Accordingly, the allocation limit for thread T0 is reset (increased) back to the initial allocation limit of 50 for CCW 4. During CCW 3, thread T2's twelve allocated entries continued to exceed the allocation threshold and thread T2 had only one active entry, which is less than the active entries threshold of three. Therefore, thread T2 continues in CCW 4 with a reduced allocation limit of 10. The allocation limit for thread T1 is reset to the initial allocation limit of 50 because while the eleven allocated entries for thread T1 exceeds the allocation threshold of 10, the seven active entries exceeds the active entries threshold of three. The allocation limit for thread T3 is reset to the initial allocation limit of 50 because the six allocated entries is less than the allocation threshold of 10. Thus, while thread T1 is using a greater number of entries in the shared resource 140, thread T1 has a level of parallelism greater than the active entries threshold and therefore does not have its allocation limit reduced.

Figure 5D:
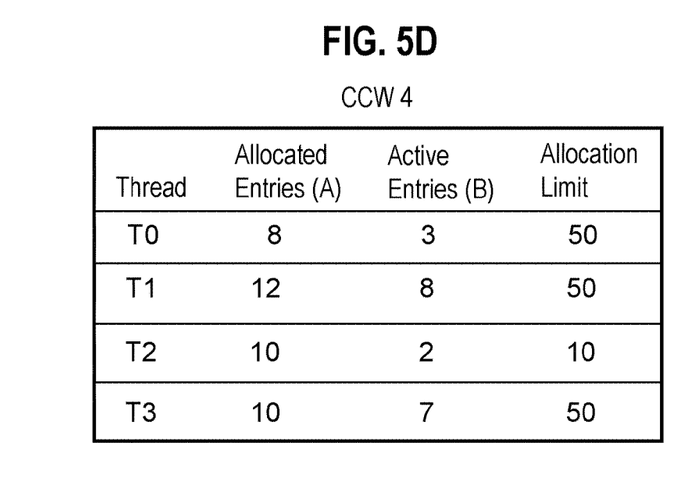
FIG. 5D depicts the example usage data acquired for threads over a fourth clock cycle window.

FIG. 5D depicts the example usage data acquired for threads T0-T3 over CCW 4 at time T4. The number of allocated entries for thread T0 decreased from eleven to eight over CCW 4 as thread T0 completed work and entries in the shared resource 140 were released. Since, at the end of CCW 4 the number of allocated entries for thread T0 is less than the allocation threshold, the allocation limit for thread T0 is reset to the initial allocation limit of 50. The number of allocated entries for thread T1 continued to increase over CCW 4, but the allocation limit for thread T1 is again reset to the initial allocation limit since the number of active entries exceeds the active entry threshold. The number of allocated entries for thread T2 decreased from twelve to ten over CCW 4 as thread T2 completed work and entries in the shared resource 140 were released. Since, at the end of CCW 4 the number of allocated entries for thread T2 is still greater than the allocated threshold of ten, and the number of active entries is less than the active entry threshold, the allocation limit for thread T2 remains reduced at ten. Over CCW 4, the number of allocated entries for thread T3 increased from six to ten, but since the number of active entries exceeds the active entry threshold, the allocation limit for thread T2 is reset to the initial allocation limit of 50. Thus, while both threads T1 and T3 have the potential to hog the shared resource 140, they both have a number of active entries that exceeds the active entry threshold, indicating a high level of parallelism. Accordingly, their allocation limits are reset to the initial allocation limit.

C. The Usefulness Metric

As previously described herein, the usefulness metric is a thread-specific ratio of the number of active entries to the number of entries that are currently allocated to the thread. The usefulness metric may be calculated each clock cycle, every N number of clock cycles, or over a period of cycles. For example, the usefulness metric may be calculated as the average usefulness metric over N number of clock cycles.

The usefulness metric may be used as an alternative to the allocation threshold and the active entries threshold for determining whether the allocation limit for a thread should be changed. For example, instead of steps 408 and 410 in FIG. 4, the usefulness metric may be calculated for the selected thread and compared to a usefulness threshold to determine whether the allocation limit for the thread should be changed. This test may be performed every clock cycle, every N number of clock cycles, or over a period of cycles, and the individual usefulness metric values may be tested, or an average of N number of usefulness metric values may be tested against the usefulness threshold. According to an embodiment, a windowed approach may be used where a thread's usefulness metric has to show poor use, e.g., not satisfy the usefulness threshold, over each clock cycle of a clock cycle window before the thread's allocation limit is reduced. Alternatively, the thread's average usefulness metric over the clock cycle window may be compared to the usefulness threshold.

The usefulness metric may also be used to determine a new allocation limit for a thread. According to an embodiment, when a determination is made that the allocation for a thread is to be changed, using either the allocation and active entries thresholds or the usefulness threshold, the usefulness metric for that thread is used to determine the new allocation limit for the thread, instead of reducing the allocation to the reduced allocation limit, as previously discussed herein in step 412 of FIG. 4. The usefulness metric may be used as an input to an equation implemented by the shared resource logic 150, where the output of the equation is the new allocation limit for the thread. Depending upon the particular equation used, this may allow the allocation limit for a thread to slowly increase as the number of active entries for the thread increases, indicating increasing parallelism, even though the thread may have fewer than the active entry threshold number of active threads. Using the usefulness metric to calculate a new allocation limit for a thread may provide more flexibility than using the reduced allocation level as previously described, but is more computationally expensive and potentially has divide-by-zero problems.

D. Addressing Resource Allocation Oscillation

The level of parallelism of a thread may change significantly over successive CCWs as the types of instructions for the thread change. Using the approaches described herein, this may cause the number of entries in the shared resource 150 allocated to the thread to oscillate between the total number of entries in the shared resource, e.g., 50, and the reduced allocation level, e.g., 10.

Techniques are provided for reducing the oscillation of resource allocations for threads by increasing the number of clock cycles over which a thread must demonstrate a satisfactory level of usefulness before the thread's allocation of a shared resource is increased. According to an embodiment, a larger CCW is used for increasing resource allocations for threads than for decreasing resource allocations for threads. For example, a CCW of 16 clock cycles may be used to decrease resource allocations for threads, while a CCW of 32 or more clock cycles is used to increase resource allocations for threads. Thus, the number of entries in the shared resource 150 allocated to a particular thread may be reduced after a set of 16 clock cycles, but the particular thread must demonstrate a sufficiently high level of parallelism over a longer period of time, i.e., 32 clock cycles, for the number of entries in the shared resource to be increased. Alternatively, instead of using a larger window of clock cycles to increase shared resource allocations, multiple windows of clock cycles may be used to increase shared resource allocations. For example, a CCW of 16 clock cycles may be used to decrease resource allocations for threads, while two or more CCWs of 16 clock cycles are used to increase resource allocations for threads.

According to another embodiment, different thresholds are used to increase resource allocations. For example, an allocation threshold of five and an active entries threshold of four may be used in steps 408 and 410, respectively, of FIG. 4 when considering whether to increase the number of entries in the shared resource 140 allocated to a thread. In this example, the lower allocation threshold of five, compared to the allocation threshold of ten used when a thread's allocation is not currently reduced, is easier to satisfy. Similarly, the higher active entry threshold of four, compared to the active entry threshold of three used when a thread's allocation is not currently reduced, is more difficult to satisfy. Thus, a combination of a lower allocation threshold and a higher active entry threshold increases the likelihood that a thread with a reduced allocation of a shared resource will continue to have a reduced allocation of the shared resource.

Although embodiments are described herein in the context of a multi-threaded microprocessor with a single shared resource, embodiments are not limited to this example and are applicable to any number of shared resources. These include a multi-threaded microprocessor with shared resource logic that manages multiple shared resources, as well as a multi-threaded microprocessor with multiple shared resource logic managing multiple shared resources.

The invention claimed is:

1. A multi-threaded microprocessor comprising:
   a shared resource having a plurality of entries; and
   shared resource logic configured to:
   determine:
      a number of entries, from the plurality of entries in the shared resource, that are allocated to a thread from a plurality of threads during a first time period, and
      a number of active entries for the thread in the shared resource during the first time period,
   use the number of entries in the shared resource that are allocated to the thread during the first time period and the number of active entries for the thread in the shared resource during the first time period, to change an allocation limit assigned to the thread for the shared resource for a second time period.

2. The multi-threaded microprocessor as recited in claim 1, wherein changing the allocation limit assigned to the thread for the shared resource for the second time period includes decreasing the allocation limit assigned to the thread for the shared resource for the second time period.

3. The multi-threaded microprocessor as recited in claim 2, wherein the allocation limit assigned to the thread for the shared resource for the second time period is decreased by an incremental amount, or to a reduced allocation limit.

4. The multi-threaded microprocessor as recited in claim 1, wherein the shared resource logic is further configured to:
   in response to determining that both the number of entries in the shared resource that are allocated to the thread during the first time period satisfies a first threshold and the number of active entries for the thread in the shared resource during the first time period satisfies a second threshold, decreasing the allocation limit assigned to the thread for the shared resource to the thread for the second time period.

5. The multi-threaded microprocessor as recited in claim 1, wherein the shared resource logic is further configured to:
   determine a usefulness metric for the thread, wherein the usefulness metric is a ratio of the number of active entries for the thread in the shared resource to the number of entries in the shared resource that are allocated to the thread, and
   compare the usefulness metric for the thread to a usefulness threshold to determine whether to change the allocation limit for the thread.

6. The multi-threaded microprocessor as recited in claim 5, wherein the shared resource logic is further configured to:
for each clock cycle of a clock cycle window, determine and compare the usefulness metric for the thread to the usefulness threshold, and
in response to the usefulness metric for the thread not satisfying the usefulness threshold for each clock cycle of the clock cycle window, decreasing the allocation limit for the thread.

7. The multi-threaded microprocessor as recited in claim 5, wherein the shared resource logic is further configured to change the allocation limit for the thread based upon the usefulness metric for the thread.

8. The multi-threaded microprocessor as recited in claim 1, wherein changing the allocation limit assigned to the thread for the shared resource for the second time period includes increasing the allocation limit assigned to the thread for the shared resource for the second time period.

9. The multi-threaded microprocessor as recited in claim 8, wherein increasing the allocation limit assigned to the thread for the shared resource for the second time period includes increasing the allocation limit assigned to the thread for the shared resource for the second time period to a total number of entries available in the shared resource.

10. The multi-threaded microprocessor as recited in claim 1, wherein the shared resource logic is further configured to:
in response to determining that either the number of entries in the shared resource that are allocated to the thread during the first time period does not satisfy a first threshold or the number of active entries for the thread in the shared resource during the first time period does not satisfy a second threshold, increasing the allocation limit assigned to the thread for the shared resource for the second time period.

11. The multi-threaded microprocessor as recited in claim 10, wherein values for the first threshold and the second threshold are selected based upon the number of entries in the shared resource that are allocated to the thread during the first time period.

12. The multi-threaded microprocessor as recited in claim 1, wherein the shared resource logic is further configured to:
in response to determining that either the number of entries in the shared resource that are allocated to the thread during the first time period does not satisfy a first threshold, or the number of active entries for the thread in the shared resource during the first time period does not satisfy a second threshold, increasing the allocation limit assigned to the thread for the shared resource for the second time period.

13. The multi-threaded microprocessor as recited in claim 1, wherein the number of active entries for the thread in the shared resource during the first time period is a least number of active entries for the thread in the shared resource during the first time period.

14. The multi-threaded microprocessor as recited in claim 1, wherein prior to the first time period, the thread is assigned an allocation limit that is a total number of available entries in the shared resource.

15. The multi-threaded microprocessor as recited in claim 1, wherein the shared resource is one or more of a load queue, a register file, or a reservation station.

16. The multi-threaded microprocessor as recited in claim 1, wherein the first time period is a first clock cycle window and the second time period is a second clock cycle window.

17. A computer-implemented method comprising:
determining, by shared resource logic in a multi-threaded microprocessor having a shared resource with a plurality of entries:
a number of entries, from the plurality of entries in the shared resource, that are allocated to a thread from a plurality of threads during a first time period, and
a number of active entries for the thread in the shared resource during the first time period, and
using, by the shared resource logic, the number of entries in the shared resource that are allocated to the thread during the first time period and the number of active entries for the thread in the shared resource during the first time period, to change an allocation limit assigned to the thread for the shared resource for a second time period.

18. The computer-implemented method as recited in claim 17, wherein changing the allocation limit assigned to the thread for the shared resource for the second time period includes decreasing the allocation limit assigned to the thread for the shared resource for the second time period.

19. The computer-implemented method as recited in claim 18, further comprising:
in response to determining, by the shared resource logic, that the number of entries in the shared resource that are allocated to the thread during the first time period satisfies a first threshold and the number of active entries for the thread in the shared resource during the first time period satisfies a second threshold, decreasing the allocation limit assigned to the thread for the shared resource for the second time period.

20. The computer-implemented method as recited in claim 17, further comprising:
determining a usefulness metric for the thread, wherein the usefulness metric is a ratio of the number of active entries for the thread in the shared resource to the number of entries in the shared resource that are allocated to the thread, and
comparing the usefulness metric for the thread to a usefulness threshold to determine whether to change the allocation limit for the thread.

* * * * *

UNITED STATES PATENT AND TRADEMARK OFFICE
CERTIFICATE OF CORRECTION

PATENT NO. : 11,294,724 B2
APPLICATION NO. : 16/585424
DATED : April 5, 2022
INVENTOR(S) : Kai Troester et al.

It is certified that error appears in the above-identified patent and that said Letters Patent is hereby corrected as shown below:

On the Title Page

Page 2, item (56) "Other Publications", delete "The International Search Authority, "Search Report" in application No. PCT/US2020/049220, dated Dec. 2020, 14 pages." insert --The International Search Authority, "Search Report" in application No. PCT/US2020/050388, dated Dec. 2020, 14 pages.--

Signed and Sealed this
Ninth Day of August, 2022

Katherine Kelly Vidal
*Director of the United States Patent and Trademark Office*